Inventors
ETIENNE C. L. de FAYMOREAU
MARK MANDEL
By
Attorney

A

F

B

G

C

H

D+E

I+J

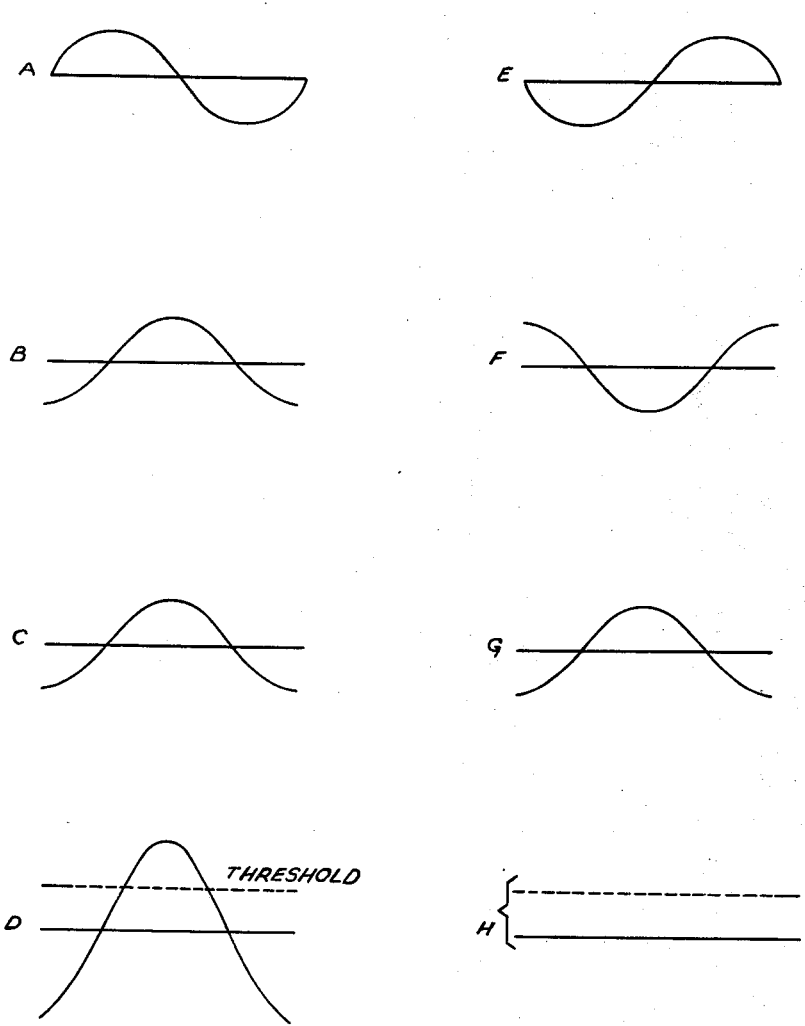

United States Patent Office 2,924,822
Patented Feb. 9, 1960

2,924,822

AZIMUTH RECEIVER

Etienne C. L. De Faymoreau, Nutley, and Mark Mandel, Bloomfield, N.J., assignors to International Telephone and Telegraph Corporation, Nutley, N.J., a corporation of Maryland Application May 5, 1958, Serial No. 733,046

9 Claims. (Cl. 343—106)

This invention relates to a radio navigation receiver and more particularly to an azimuth indicator receiver.

In certain radio navigation systems coarse and fine bearing information is received from a beacon and applied to an azimuth indicator to indicate direction. In many of these systems the directional indication depends essentially upon a phase comparison of reference signals with signals whose phase varies at different azimuthal angles from the beacon. A typical system of this kind is a system known as TACAN. In this system, coarse information is given by radiating pulses according to an asymmetrical radiation pattern having a main lobe which is rotated at a fundamental frequency, such as 15 cycles per second, and emitting a main reference signal each time the main lobe passes a given reference direction, such as north. In an airplane receiver, the modulation envelope on the pulses due to this rotation is compared in phase with the main reference signal to give a coarse azimuth indication. Information for a final indication is provided by having said rotating pattern include a number of minor lobes and emitting an auxiliary reference signal each time one of said minor lobes passes said given reference direction. The higher frequency modulation wave-form produced by the minor lobes is compared with the auxiliary reference signals and a fine azimuth indication is obtained in the airplane receiver.

Actually, in TACAN the coarse indication of bearing gives a 40 degree sector of the azimuthal angle of the mobile receiver with respect to the beason; and the more precise angle within this 40 degree sector is found by the comparison of the auxiliary reference pulse signals with a corresponding 135 cycle-per-second wave.

Formerly the 40-degree sector was maintained by a search and track operation involving the main reference pulse and the 15 cycle-per-second signal. The 15 cycle-per-second signal was phase shifted by continuously increasing amounts; and from this phase shifted signal there was produced a 40-degree gating pulse. This 40-degree gating pulse was continuously phase shifted and applied to a coincidence circuit to which the main reference pulse signal was likewise applied. When coincidence occurred between the gating pulse and the main reference pulse, a mechanical relay switched the bearing indicator motor operation from a "search" condition to a "track" condition. The track condition was controlled for finer indication by the phase comparison of the auxiliary reference pulses and the 135 cycle-per-second wave. The continued coincidence of the main reference pulse and the 15 cycle-per-second signal maintained the system in "track" operation.

It has been found that errors in bearing indication have resulted from faulty operation of the mechanical relay which was used to switch the system from a "search" condition to a "track" condition. In addition, the switching time of the relay caused a considerable delay during the transition from "search" to "track" conditions. This delay occurred as a result of the necessity of initially obtaining a sufficient number of coincident output pulses before the D.C. buildup was sufficient to cause the relay to switch from a "search" condition to a "track" condition.

Furthermore, when the output voltages of the phase comparators are at a minimum, a "null" condition exists whereby the bearing indicator motor comes to rest. It has been found that two "null" conditions exist where the output voltages of the phase comparators are at a minimum, but the output voltages under these two "null" conditions are 180 degrees out of phase with each other. One of these "null" conditions corresponds to a stable equilibrium position of the bearing indicator motor and results in a correct indication of bearing, but the other "null" condition corresponds to an unstable equilibrium position of the bearing indicator motor and results in an incorrect indication of bearing. The pilot has no way of knowing which "null" condition is finally achieved. But according to the present invention, the pilot will now have a means of ascertaining when the bearing indicator motor is at its incorrect "null" condition, thus indicating to the pilot that he should disregard this false indication of bearing. In addition, as a further precaution, the system will not go into track or fine operation until the correct "null" condition is achieved. Thus, the receiver will remain in search or coarse operation until the correct "null" condition is attained.

An object of the present invention is the provision of an improved azimuth receiver system which will overcome the aforementioned difficulties.

A further object is the elimination of bearing errors heretofore due to the operation of a mechanical relay.

A still further object is the provision of an indicator which informs the pilot of the proper time to read his bearing indicator, thus preventing the pilot from reading a false indication of bearing.

A feature of this invention is the provision of a means coupled to the 15 cycle-per-second wave component and the main reference pulse to produce a coarse signal, and a means coupled to the 135 cyle-per-second wave component and the auxiliary reference pulses to produce a fine signal. There are also means coupled to the 15 cycle-per-second wave component and the main reference pulses to enable the fine signal information to be fed into the system only when the correct "null" condition is achieved, or stated more specifically, when the correct phase relationship exists between the 15 cycle-per-second wave component and the main reference pulses.

A further feature is the provision of an indicator means which informs the pilot when the correct "null" condition is achieved and therefore informs said pilot that the bearing indicator is now reading the correct bearing position of the craft.

The above-mentioned and other features and objects of this invention will become more apparent by reference to the following description taken in conjunction with the accompanying drawings, in which:

Fig. 5 is a set of waveform sequences useful in explaining the operation of the biasing control portion of the system.

Figure 1:
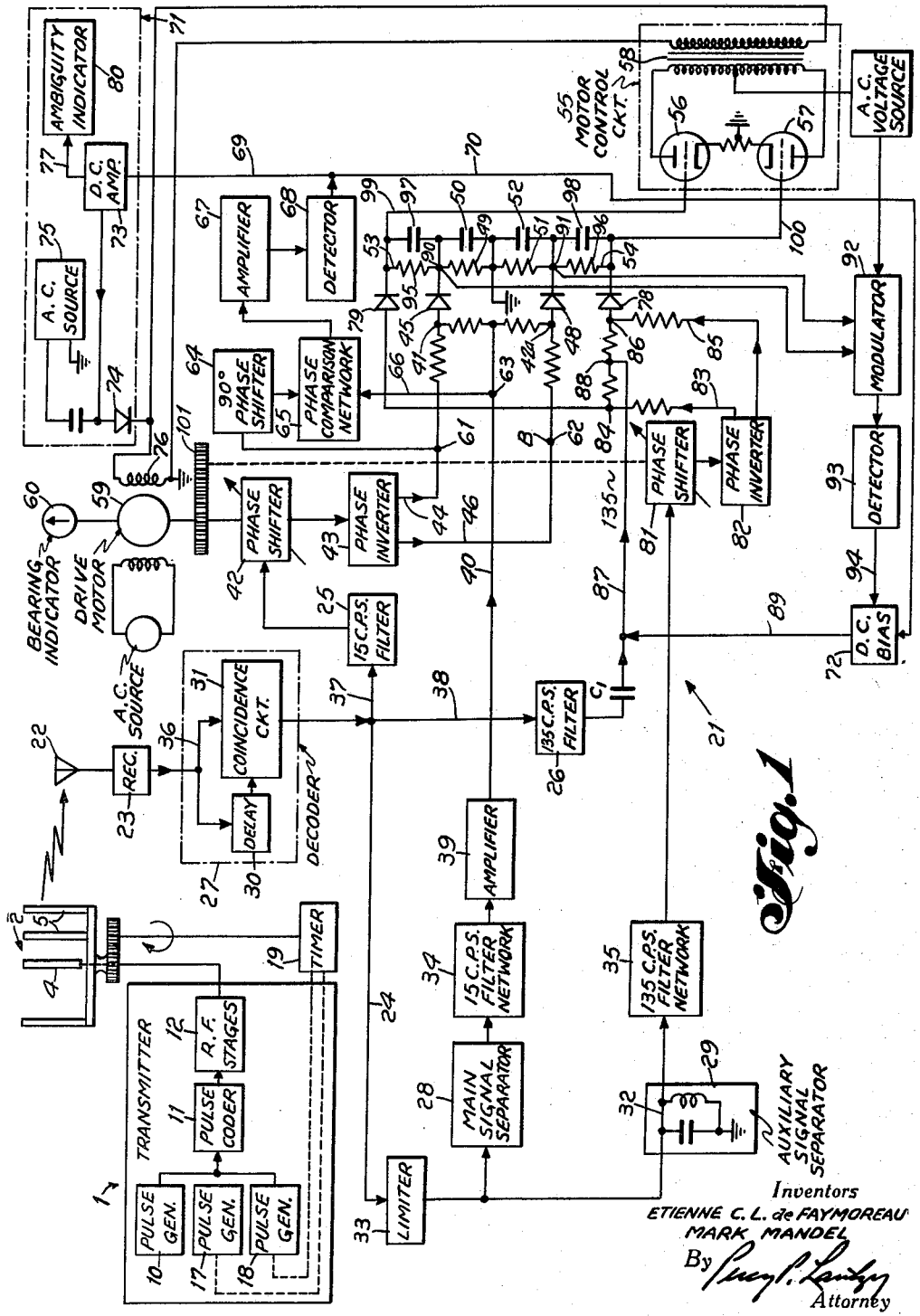
Fig. 1 is a simplified block diagram of a TACAN beacon transmitter and associated mobile receiver.
Figure 2:
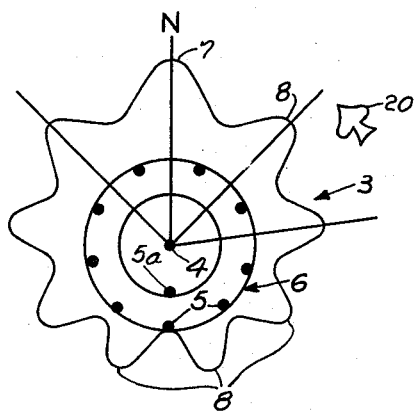
Fig. 2 is a diagram of the radiation pattern of the antenna of the beacon.

Referring to Fig. 1, a beacon station 1 emits pulses from its rotating antenna 2 according to a multilobed directional pattern 3, such as shown in Fig. 2. The pattern is rotated at the rate of 15 cycles per second. The antenna system may consist of a central omnidirectional antenna 4 with passive reflectors 5 spaced thereabout at 40-degree separations (Fig. 2), and an additional single reflector 5a, the reflectors being, for example, printed on a pair of cylinders 6 which rotate around the central radiator 4, the pattern consisting of a major lobe or directional configuration 7 produced by 5a with nine minor lobes 8 produced by reflectors 5 spaced every 40 degrees therefrom. For a more detailed understanding of antenna 2, reference should be made to the Pickles-Karpeles Patent No. 2,803,821, issued August 20, 1957.

Semi-random pulses (see Fig. 1) are generated by a pulse generator 10 in the beacon which may be, for example, a free-running multivibrator. These pulses, generated at about 2700 per second before transmission, are applied to a pulse coder 11, which changes each single pulse into a pair of pulses spaced 12 microseconds apart. The pulses from the coder 11 are used to key or modulate an R.-F. oscillator in an R.-F. section 12 which may also include various amplifier stages. The R.-F. pulses are then fed to the antenna system 2 from whence they are emitted according to the directional pattern 3 of Fig. 2. The rotation of the antenna reflectors, in effect, produces an amplitude modulation envelope 13 (Fig. 3) on the pulses with a maximum amplitude peak 14a corresponding to the maximum lobe 7 and the other peaks 14b corresponding to the minor lobes 8. The multilobed antenna pattern which is rotating at 15 cycles-per-second produces a modulation envelope of 135 cycles-per-second (9 lobes multiplied by 15 c.p.s.) on top of the fundamental of 15 cycles-per-second. The phase of this envelope varies at different azimuthal angles from the beacon stations.

Figure 3:
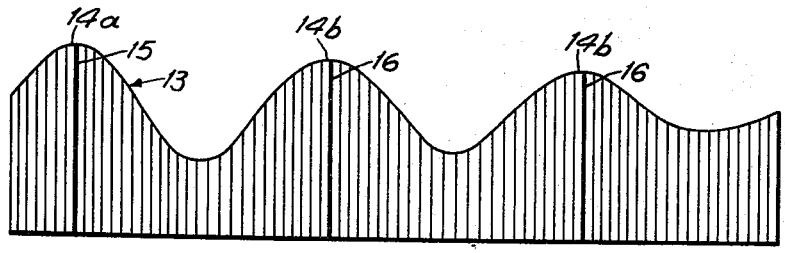
Fig. 3 is a curve showing the effective amplitude modulation envelope of the pulses transmitted from the beacon.

As the antenna system 2 rotates causing the major lobe 7 to pass a given reference direction, such as north, a reference pulse signal is emitted which is called hereinafter the "main" or "north" reference signal 15. While main signal 15 is shown as a solid black line in Fig. 3, it actually consists of a number of pulses closely spaced together in a unique pattern for identification. As each minor lobe 8 passes the reference direction, remembering that the minor lobes are spaced by 40-degrees from each other and from the north lobe, an "auxiliary" reference signal 16 is emitted. This, likewise, is shown in Fig. 3 as a solid black line, but actually consists of a unique series of pulses closely spaced together. The main reference signals 15 may be produced by a pulse generator 17 which produces 12 pulses separated by 30 microseconds, which pulses are applied to the pulse coder 11 thereby producing 12 pulse pairs, or 24 pulses, with the spacing between the pulses of a pair being 12 microseconds. The auxiliary reference signals 16 may be generated by a generator 18 producing a burst of 6 pulses, separated 24 microseconds apart (from leading edge to leading edge), which are fed from the generator 18 into the pulse coder 11 where the 6 pulses are then doubled to become 6 pairs of pulses, or 12 pulses, with a 12-microsecond spacing between adjacent pulses.

Generators 17 and 18 may consist of conventional pulse generators feeding tapped delay lines or ringing circuits to produce a desired number of pulses with the proper spacing for the north or auxiliary reference groups as described above. Suitable timing means 19, which can take any one of various forms well known in the art, may be associated with the antenna system 2 and pulse generators 17 and 18 to cause the north and auxiliary reference signals to be emitted at the proper time.

The emitted pulses are received on a receiver system 21 located in a mobile vehicle 20 (Fig. 2), such as an airplane. The signal is picked up on an omnidirectional antenna 22 and fed to a receiver 23, which removes the R.-F. envelope and detects to produce amplitude modulated signals which contain the following four components:

(1) The 15 cycle-per-second envelope wave.
(2) The 135 cycle-per-second envelope wave.
(3) The main or north reference pulse signal.
(4) The auxiliary reference pulse signal.

The output of receiver 23 is fed into decoder 27 which consists essentially of a coincidence circuit 31 to which the input pulses are fed directly along line 36, the pulses, likewise, being fed to said coincidence circuit 31 through a delay device 30 having a delay of 12 microseconds. The coincidence circuit 31 produces an output when a delayed pulse coincides with an input pulse directly applied thereto. Various other arrangements for decoding by the delay of one pulse with respect to the other will occur to those versed in the art.

The aforementioned components are separated as follows. The output of coincidence circuit 31 is then fed via lines 37 and 38 to two filters 25 and 26. The 15 cycle-per-second component which is the component produced by the major lobe for each rotation, is separated from the amplitude modulated envelope by filter 25. The 135 cycle-per-second component, which is the component produced by the 40-degree minor lobe components, is separated from the amplitude modulated envelope by filter 26.

To separate the main and auxiliary reference signals, the output of coincidence circuit 31 is also fed to amplifier and limiter circuit 33 via line 24, which removes the audio amplitude modulation therefrom. The output of limiter circuit 33 is then fed to a main signal separation circuit 28 and an auxiliary signal separation circuit 29, each of which includes a ringing circuit 32. The ringing circuit of the main signal separator 28 is tuned to approximately 33 kc. to respond to the north signal pulses which are separated by 30 microseconds. The ringing circuit 32 of auxiliary signal separator 29 is tuned to approximately 83 kc. to respond to the auxiliary signal pulses obtained from the decoder 27, which are separated by 12 microseconds. Pulses whose spacing does not correspond to the repetition frequency to which the various ringing circuits are tuned will not produce oscillations of sufficient amplitude to produce indications. For this purpose a threshold device may be incorporated either in said separators or in the circuits to which their outputs are connected.

The receiver system 21 provides for both coarse and fine operations. In coarse operation the output of main signal separator 28 is fed to filter 34. This filter extracts an output wave having the same repetition frequency as the fundamental 15 cycle-per-second component. This output wave is then fed via amplifier 39 and line 40 to points 41 and 41a, respectively. At these points the output waves are combined with the fundamental 15 cycle-per-second components derived from filter 25 in the following manner. The fundamental 15 cycle-per-second component is continuously varied by phase shifter 42. The output of phase shifter 42 is fed to phase inverter 43 which produces two 15 cycle-per-second components; one component in phase with the 15 cycle-per-second input component and the other component 180 degrees out of phase with its 15 cycle-per-second input component. The in phase 15 cycle-per-second component is then fed via line 44 to point 41, whereas the 180 degree out of phase 15 cycle-per-second component is fed via line 46 to point 41a. The 15 cycle-per-second component and main reference wave at point 41 are then applied to diode 45 and its associated RC charging networks consisting of resistor 49 and capacitor 50, whereas the combined out-of-phase 15 cycle-per-second component and main reference wave at point 41a are applied to diode 48 and its associated RC charging network consisting of resistor 51 and capacitor 52. Capacitors 50 and 52 will charge up to the peak voltage value of the composite waves fed from points 41 and 41a respectively. When the peak voltage at capacitors 50 and 52 exceed the voltage applied to the plates of diodes 45 and 48, respectively, the diodes will cutoff. Then capacitors 50 and 52 will discharge slowly via resistors 53 and 54 to the grids of motor control circuit 55.

Motor control circuit 55 has two tubes 56 and 57 connected in push-pull with a transformer 58 across the outputs thereof. The outputs of these 15 cycle-per-second charging networks are dependent upon the phase relation between the 15 cycle-per-second components and the main reference pulse. As the azimuth location of the aircraft changes, the phase relation between the 15 cycle-per-second and the main reference pulse changes. The phase shifter 42 continuously varies the 15 cycle-per-second component in such a direction as to produce a "null" condition. When this "null" condition is reached, the motor control circuit 55 will have a minimum voltage output representing a balanced condition in the primary winding 58 causing drive motor 59 to come to rest. This position will be indicative of the coarse indication of bearing and is indicated on bearing indicator 60.

Figure 4:
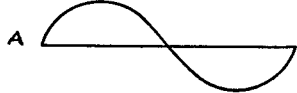
Fig. 4 is a set of waveform sequences useful in explaining the operation of the system under different null conditions.
Figure 4:
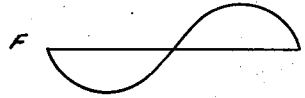
Figure 4:
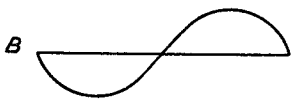
Figure 4:
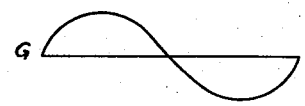
Figure 4:
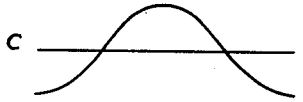
Figure 4:
Figure 4:
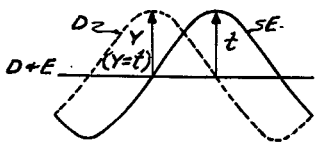
Figure 4:
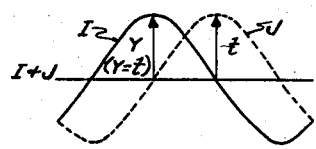

In order to more clearly understand how two "null" conditions may exist, reference is made to the following waveforms. As was previously described, the output of phase inverter 43 produces two 15 cycle-per-second components. Fig. 4, curve A represents one of the 15 cycle-per-second waves located at point 61. At point 62 the other 15 cycle-per-second wave, which is phase shifted by 180 degrees is shown in Fig. 4, curve B. The main reference wave derived from filter 34 and located at point 63 is illustrated in Fig. 4, curve C. The resultant waveforms at points 41 and 41a of each 15 cycle-per-second wave combined with the main reference wave is shown in Fig. 4, curves D and E. The dotted curve D represents the resultant waveform of the in phase 15 cycle-per-second wave and the main reference wave at point 41. Curve E represents the resultant waveforms of the phase shifted 15 cycle-per-second wave and the main reference wave at point 41a. As can be seen, the amplitudes of the peak voltage of both curves D and E are equal, thus representing a balanced voltage output or a "null" condition at the output of RC charging networks consisting of resistors 49 and 51 and capacitors 50 and 52. This balanced voltage output is fed into the grids of motor control circuit 55. Due to the voltage applied to the grids of tubes 56 and 57, the output of transformer 58 will not produce minimum voltage, causing drive motor 59 to come to rest. For purposes of explanation, this phasing relationship between the 15 cycle-per-second wave and the main reference wave as illustrated in Fig. 4, curves A, B and C has been established as the correct "null" condition.

Another "null" condition will exist under the following phase conditions. Fig. 4, curve F represents the 15 cycle-per-second wave phase shifted 180 degrees from its earlier condition and located at point 61. The 15 cycle-per-second wave at point 62 is shown in Fig. 4, curve G. The main reference wave represented at point 63 is shown in Fig. 4, curve H. The resultant waveforms at points 41 and 41a, respectively, are shown in Fig. 4, curves I and J. As can be seen, the amplitude of the peak voltage of curves I and J are equal, thus resulting in a balanced voltage condition or, as previously described, a "null" condition where drive motor 59 will come to rest. When comparing curves I and J with curves D and E, the resultant curves obtained are reversed in phase by a certain phase relationship. Therefore, although both phasing conditions produce a balanced voltage output or a "null" condition, one is the correct "null" condition or the true coarse indication of bearing, whereas the other "null" condition is incorrect and produces an incorrect coarse indication of bearing. In order to prevent this ambiguity, a circuit was designed which will inform the pilot whether a correct or an incorrect coarse indication of bearing is finally attained on bearing indicator 60. In addition, this circuit will operate in such a manner that it will not allow receiver 21 to go into fine operation unless the correct phasing condition exists between the 15 cycle-per-second waves and the main reference waves or, as stated otherwise, when a correct "null" condition is achieved.

This circuit operates in the following manner. The 15 cycle-per-second wave located at point 61 is shown in Fig. 5, curve A. This 15 cycle-per-second component is fed into phase shifter 64 where its output, is phase shifted by 90 degrees and which is shown in Fig. 5, curve B. This wave is then fed into phase comparator 65 where it is compared with the main reference wave which is fed into phase comparator 65 via line 66. The main reference wave at point 63 is illustrated in Fig. 5, curve C. The output of phase comparator 65 is then fed into amplifier 67 which is set at a certain threshold level which will be overcome only when the output voltage of phase comparator 65 is of sufficient magnitude. Amplifier 67 is so designed that the output voltage of phase comparator 65 is sufficient to overcome this threshold level only when the 15 cycle-per-second wave leads the main reference wave by 90 degrees. As can be seen from Fig. 5, curve D, the magnitude of the peak voltage appearing at the output of phase comparator 65 will overcome the threshold level of amplifier 67. This voltage output is fed into detector 68 which produces a D.C. voltage proportional to the peak A.C. voltage output of amplifier 67. The output of detector 68 is then fed via line 69 to the ambiguity indicator circuit 71 and via line 70 to the D.C. bias control 72. Only when the correct phasing relation exists between the 15 cycle-per-second wave and the main reference wave will the threshold level of amplifier 67 be overcome so as to produce an output which is fed to D.C. amplifier 73 via detector 68 and line 69. The output of amplifier 73 is fed into diode 74 via line 59 and into ambiguity indicator 80 via line 77. Diode 74 is connected in such a manner that it will conduct the A.C. voltage from source 75 to motor winding 76, thus causing drive motor 59 to rotate, only when D.C. amplifier 73 does not receive an input from detector 68. This condition arises only when the 15 cycle-per-second wave is not leading the main reference wave by 90 degrees, or stated otherwise when the incorrect "null" condition exists. Thus, ambiguity indicator 80 is so connected that, the pilot observing this indicator will be informed by a flag signal or any form of indicating means, when the correct bearing indicator is present in bearing indicator 60. When the phasing between the 15 cycle-per-second wave and the main reference wave is incorrect, the threshold level of amplifier 67 will not be overcome, thus detector 68 will have no output to pass to D.C. amplifier 73 and ambiguity indicator 80 will inform the pilot that the incorrect bearing indication is now present on bearing indicator 60. This condition can best be illustrated by referring to the following waveforms. Fig. 5, curve E, represents the 15 cycle-per-second wave at point 61 phase shifted by 180 degrees from its earlier condition represented in Fig. 5, curve A. This wave is then fed into phase shifter 64 where its output is shown in Fig. 5, curve F. The main reference wave at point 63 is now illustrated in Fig. 5, curve G.

As will be noted, under the following phasing relationships, the output of phase comparator 65 is not sufficient to overcome the threshold level of amplifier 67. For the phase shifted 15 cycle-per-second wave and the main reference wave as can be seen by adding the resultant of curves F and G of Fig. 5, will cancel each other out. Since the output of phase comparator 65 is dependent on the phase relationships between the 15 cycle-per-second waves and the main reference wave, its output will be insufficient to overcome the threshold level of amplifier 67 when the incorrect phase relationships between said waves as shown in Fig. 5, curves F, and G exist.

When the correct phase relationship exists between the 15 cycle-per-second wave and the main reference wave, as illustrated in Fig. 5, curves B and C, the threshold level of amplifier 67 will be overcome and thus an output will be present in D.C. amplifier 73 via detector 68 and line 69. Amplifier 73 will then pass its output to diode 74 which will cause it to non-conduct, thus cutting off the A.C. voltage from voltage source 75 to motor winding 76. During this condition, the ambiguity indicator 76 will indicate to the pilot that a correct "null" condition is present and that the true "coarse" indication may now be read on bearing indicator 60.

Once the correct "null" condition is achieved and the true "coarse" indication is read on bearing indicator 60, the system goes into "fine" operation. Once the receiver is in fine operation, it is controlled by the 135 cycle-per-second wave derived from filter 26 and the auxiliary reference wave derived from filter 35, which will result in a more accurate indication. The output of the 135 cycle-per-second filter 35 is fed into phase shifter 81. This phase shifted output, which is continuously varied as a result of being coupled to the output of drive motor 59 through a nine-to-one reduction gear train 101, is fed directly into phase inverter 82 which produces two 135 cycle-per-second wave components. One 135 cycle-per-second wave is in phase with the 135 cycle-per-second component fed into phase inverter 82, and the other 135 cycle-per-second wave is 180 degrees out of phase with the 135 cycle-per-second input component. The in phase 135 cycle-per-second wave is then fed via line 83 to point 84, whereas the 180 degree out of phase 135 cycle-per-second wave is fed via line 85 to point 86. The 135 cycle-per-second output from filter 26 is fed via line 87 to point 88 where it combines with the in phase 135 cycle-per-second wave and the out of phase 135 cycle-per-second wave. The combined waves are fed to diodes 78 and 79 which is normally non-conducting due to the D.C. bias which is fed from D.C. bias 72 to point 88 via lines 87 and 89, causing said diodes to be biased beyond cut-off. Once the correct "null" condition is achieved diodes 78 and 79 will begin conducting. This occurs in the following manner. As previously stated, the output of detector 68 is fed via line 70 to D.C. bias 72. In addition, the D.C. voltage output of the 15 cycle-per-second charging networks which is a measure of the phase difference between the in phase and out-of-phase 15 cycle-per-second waves and the main reference waves are fed from points 90 and 91 to modulator 92. Modulator 92 produces an A.C. voltage output proportional to the D.C. voltage deviation from the correct "null" condition as fed from the 15 cycle-per-second charging networks. The output of modulator 92 is then fed into detector 93 which produces a D.C. output voltage corresponding to the peak voltage of the A.C. input voltage fed from modulator 92. Detector 93 is so designed that at the correct "null" conditions, the peak voltage from modulator 92 will produce a maximum voltage out of detector 93. This output is then fed into D.C. bias 72 via line 94. When a certain phase relationship between the 15 cycle-per-second waves and the main reference waves exists which is of such a value so that the correct "null" condition is produced the output voltage of detectors 68 and 93 will be sufficient to overcome the D.C. bias from bias control 72. When this bias is overcome, diodes 78 and 79 will begin conducting. Thus, the 135 cycle-per-second waves and the auxiliary reference waves will be fed via diodes 78 and 79 to the 135 cycle-per-second charging networks composed of resistors 94 and 95 and capacitors 97 and 98. Capacitors 97 and 98 will charge to the peak voltage value of the composite waves which are added to each other at points 84 and 86. When the peak voltage of capacitors 97 and 98 exceed the voltage applied to the plates of diodes 78 and 79, the diodes will cut-off. The capacitors 97 and 98 will then discharge via lines 99 and 100 to the grids of motor control circuit 55. The outputs of tubes 56 and 57 of motor control circuit 55 will apply a voltage to the primary of transformer 58. This voltage will be applied via the secondary of transformer 58 to the motor winding 76 of drive motor 59 causing the drive motor to rotate. Thus, motor control circuit 55 will control the speed of drive motor 59. The "fine" bearing indication of receiver 21 will then be read on bearing indicator 80 which is coupled directly to the output of drive motor 59.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a radio navigation system having a receiver located on a mobile craft adapted to detect positional information from a beacon emitting a complex signal including a fundamental wave, a harmonic wave, and spaced main and auxiliary reference pulses having predetermined repetition frequencies equal to the frequencies of said fundamental and harmonic waves respectively, means to separate the aforementioned components of said complex signal so as to obtain a fundamental wave output, a harmonic wave output, a main reference pulse output and an auxiliary reference pulse output, a bearing indicator means, a motor to control said bearing indicator means, and a motor control means; first means coupled to said fundamental wave output and said main reference pulse output to produce and apply to said motor control means a coarse signal indicative of the azimuthal sector in which said craft is located with respect to said beacon, second means coupled to said harmonic wave output and said auxiliary reference pulse output to produce and apply to said motor control means a fine signal indicative of the angular position of said craft within said azimuthal sector, and means coupled to said fundamental wave output and main reference pulse output to render said second means operative only when a given phase relationship exists between said fundamental wave and said main reference pulse.

2. In a radio navigation system having a receiver located on a mobile craft adapted to detect positional information from a beacon emitting a complex signal including a fundamental wave, a harmonic wave, and spaced main and auxiliary reference pulses having predetermined repetition frequencies equal to the frequencies of said fundamental and harmonic waves respectively, means to separate the aforementioned components of said complex signal so as to obtain a fundamental wave output, a harmonic wave output, a main reference pulse output and an auxiliary reference pulse output, a bearing indicator means, a motor to control said bearing indicator means, and a motor control means; first means coupled to said fundamental wave output and said main reference pulse output to produce and apply said motor control means a coarse signal indicative of the azimuthal sector in which said craft is located with respect to said beacon, second means coupled to said harmonic wave output and said auxiliary reference pulse output to produce and apply to said motor control means a fine signal indicative of the angular position of said craft within said azimuthal sector, means to produce a bias potential coupled to said second means to prevent said harmonic wave output and said auxiliary reference pulse output from being fed into said second means, bias control means coupled to said fundamental wave output and said main reference output to produce a signal dependent on the phase relationship between said fundamental wave output and said main reference pulse output, and means coupling said signal to said bias potential producing means to nullify said bias potential and allow said harmonic wave output and said auxiliary reference pulses to be applied to said second means.

3. A radio navigation system as in claim 2 wherein said bias control means includes a first phase sensing means which produces a first control signal dependent on the phase relationship between said fundamental wave output and said main reference pulse output, and a second phase sensing means which produces a second control signal dependent on the phase relationship between said fundamental wave output and said main reference pulse output.

4. A radio navigation system as in claim 3 wherein said first phase sensing means includes a first phase shifting means for shifting the relative phase between said fundamental wave and said main reference pulse, a phase inverter coupled to the output of said first phase shifter for producing a first output in phase with its input and a second output 180 degrees out of phase with its input, second phase shifting means for shifting the phase of said first output a predetermined amount, phase comparison means for comparing the phase of the output of said second phase shifting means and said main reference pulse output to produce a control signal, an amplifier coupled to the output of said phase comparison means, said control signal causing said amplifier to conduct only when a certain phase relationship exists between said first output and said main reference pulse output, and a first detector coupled to the output of said amplifier to produce a first control signal.

5. A radio navigation system as in claim 4 wherein said second phase sensing means includes a modulator, means to couple the output of said first means to said modulator, and a second detector coupled to the output of said modulator to produce a second control signal.

6. In a radio navigation system having a receiver located on a mobile craft adapted to detect positional information from a beacon emitting a complex signal including a fundamental wave, a harmonic wave, and spaced main and auxiliary reference pulses having predetermined repetition frequencies equal to the frequencies of said fundamental and harmonic waves respectively, means to separate the aforementioned components of said complex signal so as to obtain a fundamental wave output, a harmonic wave output, a main reference pulse output, and an auxiliary reference pulse output, a bearing indicating means, a motor to control said bearing indicator means, and a motor control means; a first charging network coupled to said fundamental wave output and said main reference pulse output to produce and apply to said motor control means a coarse signal indicative of the azimuthal sector in which said craft is located with respect to said beacon, a second charging network coupled to said harmonic wave output and said auxiliary reference pulse output to produce and apply to said motor control means a fine signal indicative of the angular position of said craft within said azimuthal sector, a first phase sensing means which produces a first control signal dependent on the phase relationship between said fundamental wave output and said main reference pulse output, and a second phase sensing means which produces a second control signal dependent on the phase relationship between said fundamental wave output and said main reference pulse output, phase sensing indicating means coupled to the output of said first phase sensing means and adapted to indicate only when a given phase relationship exists between said first output and said main reference pulse output, bias potential producing means coupled to said second charging network to prevent said harmonic wave output and said auxiliary reference pulse output from being fed into said second charging network, and means coupling said first and second control signals to said bias potential producing means so as to nullify said bias potential and allow said harmonic wave output and said auxiliary reference pulse output to be applied to said second charging network.

7. A radio navigation system as in claim 6 wherein each of said first and second charging networks include a diode, a resistor coupled to the output of said diode, and a capacitor coupled across said resistor.

8. A radio navigation system as in claim 6 wherein said phase sensing indicating means includes an amplifier having two outputs, the input of said amplifier coupled to the output of said first phase sensing means, an indicator coupled to one output of said amplifier, a diode coupled to the other output of said amplifier, a source of voltage, said diode coupling said source of voltage to a winding of said motor causing it to rotate when a given phase relationship exists between said first output and said main reference pulse outputs, and means to prevent said source of voltage from being fed to a winding of said motor when another phase relationship exists between said first output and said main reference pulses and said main reference pulse output.

9. In a radio navigational system having a receiver located on a mobile craft adapted to detect positional information from a beacon emitting a complex signal including a fundamental wave, a harmonic wave, and spaced main and auxiliary reference pulses having predetermined repetition frequencies equal to the frequencies of said fundamental and harmonic waves respectively, means to separate the aforementioned components of said complex signal so as to obtain a fundamental wave output, a harmonic wave output, a main reference pulse output, and an auxiliary reference pulse output, a bearing indicator means, a motor to control said bearing indicator means, and a motor control means; a first charging network coupled to said fundamental wave output and said main reference pulse output to produce and apply to said motor control means a coarse signal indicative of the azimuthal sector in which said craft is located with respect to said beacon, a second charging network coupled to said harmonic wave output and said auxiliary reference pulse output to produce and apply to said control means a fine signal indicative of the angular position of said craft within said azimuthal sector, a first phase shifting means for shifting the relative phase between said fundamental wave and said main reference pulse, a phase inverter coupled to the output of said first phase shifter for producing a first output in phase with its input and a second output 180 degrees out of phase with its input, second phase shifting means for shifting the phase of said first output 90 degrees, phase comparison means for comparing the phase of the output of said second phase shifting means and said main reference pulse output to produce a control signal, an amplifier coupled to the output of said phase comparison means, said control signal causing said amplifier to conduct only when a certain phase relationship exists between said first output and said main reference pulse output, a first detector coupled to the output of said amplifier to produce a first control signal, phase sensing indicating means coupled to the output of said first detector and adapted to indicate only when a given phase relationship exists between said first output and said main reference pulse output, a modulator, means to couple the output of said first charging network to said modulator, a second detector coupled to the output of said modulator to produce a second control signal, bias potential producing means coupled to said second charging network to prevent said harmonic wave output and said auxiliary reference pulse output from being fed into said second charging network, and means coupling said first and second control signals to said bias potential producing means so as to nullify said bias potential and allow said harmonic wave output and said auxiliary reference pulse output to be applied to said second charging network.

No references cited.